June 19, 1928.  
M. O. REEVES  
SIDE FACE DRIVE CHAIN  
Filed Nov. 6, 1924  
1,673,950

INVENTOR.
Milton O. Reeves,
BY
Hood + Hahn
ATTORNEYS

Patented June 19, 1928.

1,673,950

UNITED STATES PATENT OFFICE.

MILTON O. REEVES, OF COLUMBUS, INDIANA, ASSIGNOR TO REEVES-PULLEY COMPANY, OF COLUMBUS, INDIANA, A CORPORATION OF INDIANA.

SIDE-FACE DRIVE CHAIN.

Application filed November 6, 1924. Serial No. 748,118.

The object of my invention is to produce an improved form of drive chain in which power is delivered to and from the edge of the chain.

The accompanying drawings illustrate my invention.

Figure 1:
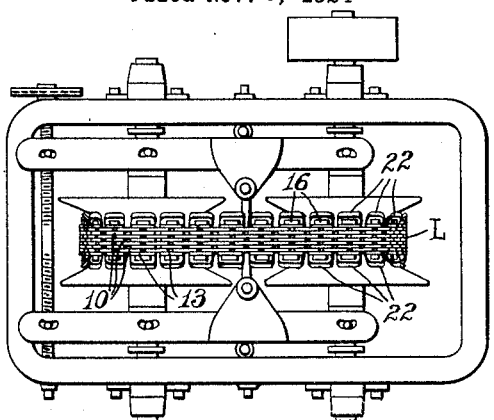
Figure 2:
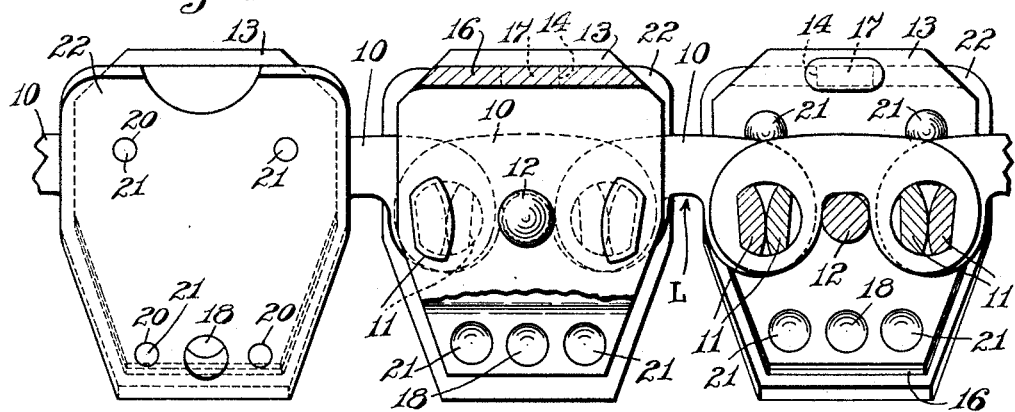
Figure 3:
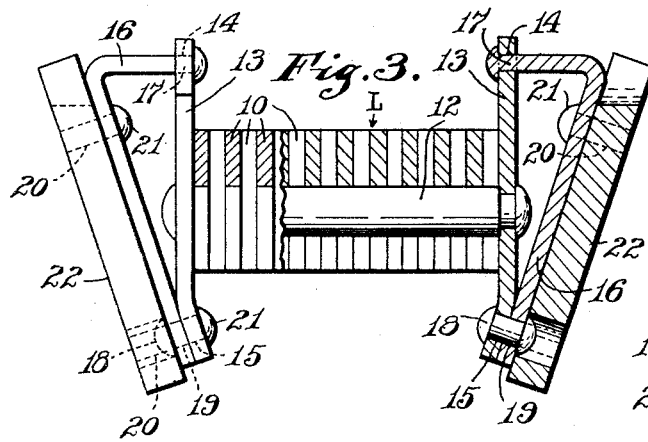
Figure 4:
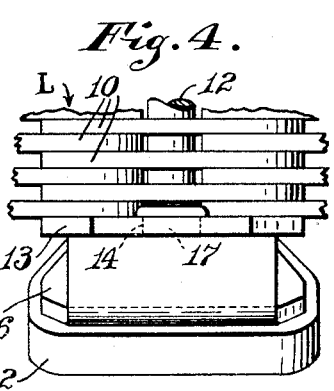

Fig. 1 is a diagrammatic view of a "Reeves" speed-varying mechanism equipped with my improved chain; Fig. 2 is an elevation and vertical section of the chain; Fig. 3 a two-plane transverse section, and Fig. 4 a fragmentary plan.

In the drawings L indicates a link belt or chain of desired length and approximate desired width capable of sustaining a lateral or edgewise load. The precise details of construction of the main body of the belt is not the essence of my present invention and I have shown, for purposes of illustration, a novel form which is the subject matter of my copending application for patent, filed July 11, 1924, Serial No. 727,838, the main body of the chain comprising successive interdigitated transverse groups of links 10 perforated at their ends, to receive cooperating rocker bars 11 and pressure pins 12.

The power receiving and delivering faces of my belt need to converge and heretofore the working faces have been formed by wedge-shaped portions of suitable material, such as leather, applied directly to the edge, or outer, links of the belt, involving a considerable waste of such material and difference in compressibility in the thick and thin portions.

In my present construction the edge links 13 of the belt extend laterally beyond the other links, are bent inwardly at their inner ends, and perforated at 14, 15 for reception of fastening members.

Attached to each link 13 is an L-shaped plate 16, the foot and head of which abut the link, the foot being provided with a short finger 17, passed through opening 14 and riveted. A rivet 18 is passed through perforation 15 of link 13 and a registering perforation 19 in the head of plate 16. The main stem or body of plate 16 is perforated at various appropriate points 20 to receive rivets or pins 21 which serve to anchor in place the friction pieces 22 which are conveniently of uniform thickness and cemented to the outer faces of the stems or main bodies of plate 16.

By this construction the friction faces are of uniform thickness which may be readily cut from commercial stock and they may be readily replaced in any shop.

I claim as my invention:

A drive belt comprising a plurality of pressure bars, each consisting of a plurality of links, a bridge rod extending between the outer links, engaging the same to limit approach of said outer links and engaging the intermediate links laterally of the bar and converging plates carried by the outer links; connecting series of links between the interdigitated links of adjacent pressure bars and means connecting the pressure bar links and interdigitated links.

In witness whereof, I have hereunto set my hand this 1st day of November, A. D. one thousand nine hundred and twenty four.

MILTON O. REEVES.